Sept. 13, 1960 C. J. GENTILE 2,952,279
DUPLICATOR ROUTER TURNING TOOL
Filed Dec. 4, 1957 2 Sheets-Sheet 1
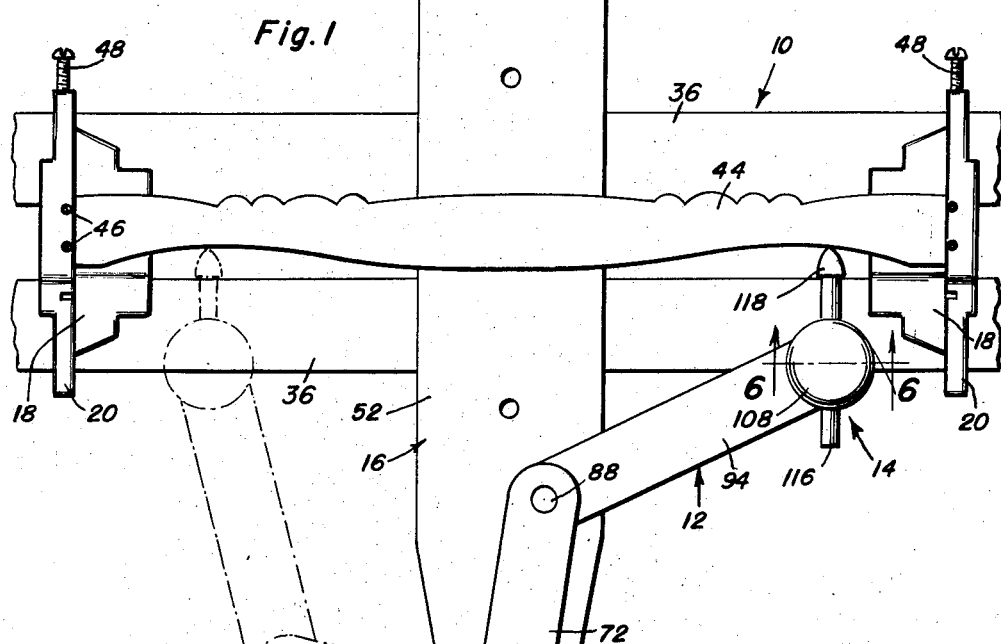
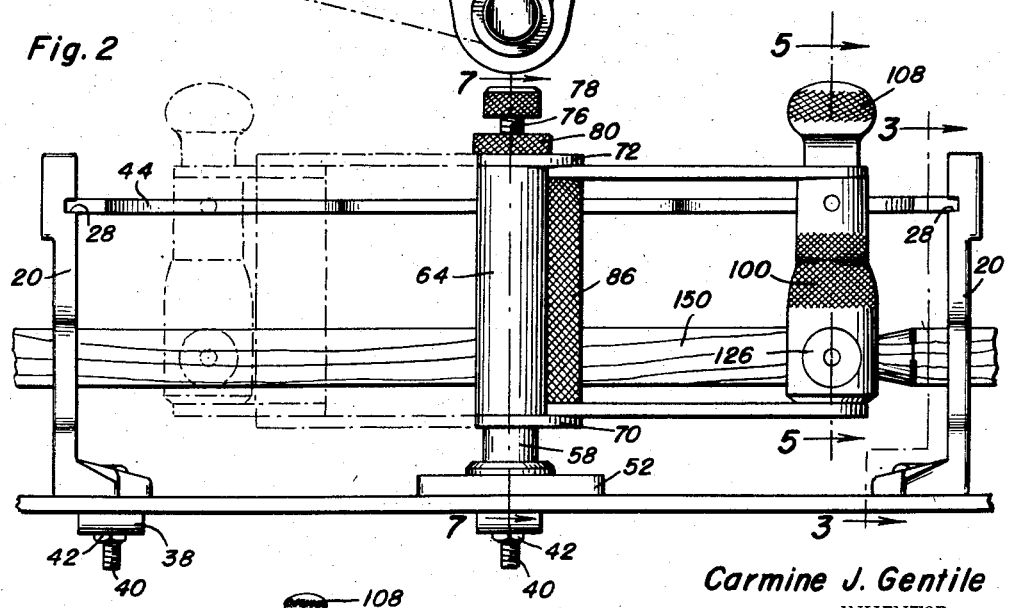
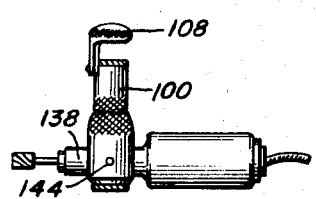
Carmine J. Gentile
INVENTOR.

Sept. 13, 1960 C. J. GENTILE 2,952,279
DUPLICATOR ROUTER TURNING TOOL
Filed Dec. 4, 1957 2 Sheets-Sheet 2

Carmine J. Gentile
INVENTOR.

BY *Clarence A. O'Brien*
*and Harvey B. Jackson*
Attorneys

United States Patent Office 2,952,279
Patented Sept. 13, 1960

2,952,279

DUPLICATOR ROUTER TURNING TOOL

Carmine J. Gentile, 3227 Fairmount Ave., San Diego, Calif.

Filed Dec. 4, 1957, Ser. No. 700,584

5 Claims. (Cl. 142—55)

This invention relates generally to wood and metal working tools, and more particularly to a duplicator router turning tool attachment.

The primary object of this invention is to provide an attachment for a lathe, which may be used in conjunction with the lathe for producing symmetrical articles which may be turned on the lathe, and may be adapted to follow a template to be used in conjunction therewith.

A further object of this invention is to provide an attachment of the character described wherein means are provided for the easy and ready manual manipulation of the tool.

Still a further object of this invention is to produce an attachment for a lathe wherein a sample of the actual article to be produced may be used in lieu of a template, whereby a person using the same may have an actual model of the piece to be produced while working on another article.

Still a further object of this invention is to produce a duplicator router turning tool attachment whereby a router may be used in place of a chisel which would be used when the work is to be turned, and this router would then follow the contours of the template because of its being mounted on the same member as the template follower. Thus, the router by being moved from one end of the attachment to the other may give the proper contour to an article to be formed. Additionally, the router may be moved upwardly or downwardly with respect to the workpiece and the template so that not only the longitudinal contour, but the vertical contour as well may be adapted from the sample to the article being worked upon.

An even further object of this invention is to provide a device of the character described whereby this tool may be used for routing and duplicating flat pieces of wood, so that an electric router may be used to work on a flat surface.

Still another object of this invention is to provide a duplicator router turning tool attachment whereby two spaced support members are provided, each having bases and upwardly projecting ends thereon, which may be individually connected to the ways of a lathe, and then adjusted in position either toward or away from each other, so that the length of a template or sample to be used when forming the duplicate article, may be of any desired length and yet still be accommodated by the frame means of my novel device.

Yet a further object of this invention is to provide a simple and inexpensive device, yet one which is exceedingly effective for the purpose for which it is designed.

This invention contemplates the use of a lathe frame including ways on which bases are adapted to be mounted. There are two upstanding ends to the bases, which have central openings formed therethrough, so that when the bases are mounted on a lathe the workpiece may be passed through the openings and be located therebetween. At the upper portion of the ends would be the template or the sample to be worked upon. A transverse plate would be mounted to the ways of the lathe, and a linkage pivoted thereto. A vertical member on the free end of the linkage has a follower mounted at the upper end thereof and a chisel or a router tool mounted at the lower end thereof. Handles are also provided on the linkage so that easy manipulation is provided. Thus, the follower may be passed along the template or sample, and the working tool would then form a corresponding pattern upon the material to be worked upon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational plan view illustrating the device comprising the present invention showing a template in place in the frame means;

Figure 2 is a front elevational view of the device illustrated in Figure 1;

Figure 9 is a side elevational view illustrating the vertical tool holding member holding an electric router in place.

Figure 3:
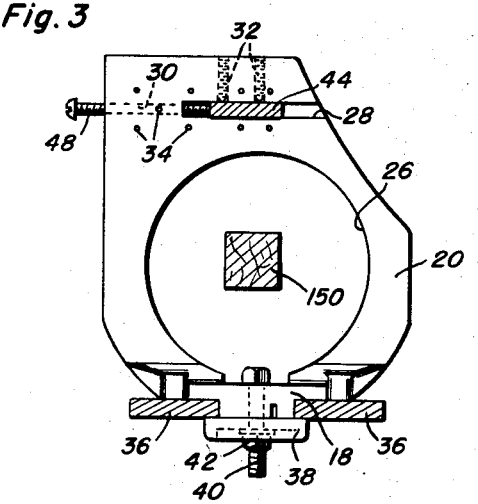
Figure 3 is a vertical sectional view taken substantially along the plane indicated by reference line 3—3 of Figure 2.

Referring now more specifically to the drawings, the numeral 10 generally designates a lathe frame with which the present invention is intended to be used. The numeral 12 designates the linkage for supporting the vertical work holding member 14 in place upon transverse plate 16 which is adapted to be secured to the ways 36 of the lathe frame 10 in a manner to be hereinafter set forth.

The lathe frame 10 has removably and slidably secured thereto two base members 18 having upwardly projecting ends 20 mounted thereon. Large central openings 26 are formed through each of the ends 20. Horizontally disposed slots 28 are formed on the inner surfaces of ends 20. The horizontally threaded bore 30 is formed to the rear of each end 20, and in alignment with slots 28. A plurality of vertical bores 32 are formed through the top of each end 20, and intersect the slots 28. A plurality of horizontal openings 34 are formed in the upper portion of side 20 for various purposes, among which are the mounting of a template, or working sample to be used when forming a duplicate article.

Figure 4:
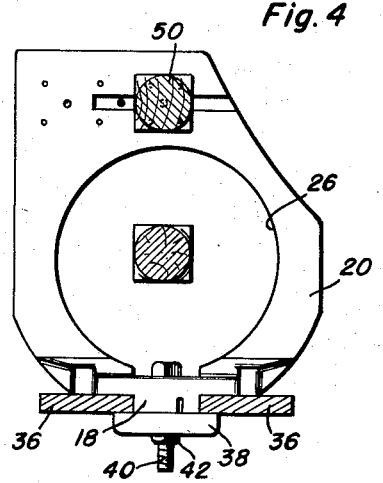
Figure 4 is a vertical sectional view similar to the view illustrated in Figure 3, illustrating a sample in place instead of a template.

A portion of each base 18 projects between the ways 36, and a clamp 38 is used to clamp each base 18 to ways 36. A bolt 40 is passed through base 18 between ways 36 and thence through clamp 38, and secured therethrough by means of a bolt 42. A plurality of these clamping means may be used as is necessary. It will be realized of course, that by use of these clamping means the ends 20 may be brought toward or away from each other so as to accommodate a template or sample of any desired length. In Figures 1 and 3 particularly there may be seen a template 44 which is mounted in slot 28 and held therein by means of bolts 46 which are threaded into vertical openings 32. A horizontal bolt 48 is disposed in horizontally threaded bore 30 so as to form a limiting position for the template 44 so that this template may be moved forwardly or rearwardly within slot 28, so as to properly position the same over the work. Looking now at Figure 4 in particular, it may be seen that the sample 50 of the article to be duplicated is fixed in position between the upper portions of ends 20. The sample 50 is held in place by means of horizontal bolts which pass through certain of the horizontal openings 34 formed therethrough. Thus the sample 50 is locked in place so that the following device may trace the contours of same so as to produce an accurately defined duplicated article.

A transverse plate 52 is connected across the ways 36 of the lathe and is clamped thereto by a means similar to the clamping means used for clamping the bases 18 to the ways 36. Plate 52 has downwardly projecting extensions 54 which are to be disposed between ways 36 of the lathes. Then the clamp 38 would be fastened thereto so that the ways 36 will be clamped between clamp 38 and plate 52. At the forward portion of plate 52, an apertured vertical bore 56 is formed therethrough. Into this bore is threaded a stud 58 which has a downwardly projecting threaded portion 50 threadedly engaged therein. A centrally located depression 62 is formed in the upper surface of stud 58.

The linkage 12 is constructed at one end of a downwardly opening, vertical, closed cylinder 64, which is to be rotatably disposed about stud 58. The closed end 66 of cylinder 64, has a vertical threaded bore 68 formed therethrough. A bottom link 70, is disposed about stud 58, and is connected to the lower or open edge portion of cylinder 64. An upper link 72 is formed with a vertical threaded bore 74 formed therethrough, and this link is positioned on cylinder 64 so that bore 74 is in alignment with bore 68. A bolt 76 having a knurled head 78 is threaded through the aligned bores, and has its bottom portion seated in depression 62. A knurled lock nut 80 is disposed on the upper portion of the upper link 72, and serves to lock the bolt 76 in place. Thus, it may be seen that the cylinder 64 is vertically adjustable on stud 58, by means of bolt 76. The other end of lower and upper links 70 and 72 respectively are formed with vertical openings 82 and 84. A knurled vertical handle 86 having upper and lower projections thereon 88 and 90 respectively, are passed through openings 92 in upper link 94, and opening 96 in lower link 98, respectively. Upper and lower links 72 and 70 are also connected to the knurled handle 86. The free ends of upper and lower links 94 and 98 respectively are connected to vertical tool holding member 14.

Vertical tool holding member 14 is constructed of a vertical member 100. A blind bore 102 is formed in the lower end of vertical member 100, and an upstanding projection 104 formed on the upper surface of lower link 98 is engaged therein. The upper portion of vertical member 100 has a threaded blind bore 101 formed in the upper surface thereof. Upper link 94 has a bore 102 formed therethrough and a counterbore 104 formed in the upper surface thereof. A small bolt 106 is passed through bore 102 and threadedly engages bore 101, so that link 94 is held to vertical member 100. Vertical member 100 has a knurled surface thereon, and a handle 108 connected at the upper end thereof. A diametrical threaded bore 110 is formed through the upper end of vertical member 100. Another diametrical bore 112 is formed through the lower end of vertical member 100. A smooth horizontal bore 114 is formed through the upper end of vertical member 100 and intersects threaded bore 110. A follower 116 having a following surface 118 is passed through bore 114 and held in place therein, by means of a setscrew 120 which is threaded through threaded bore 110, and engage the follower 116. A large vertical opening 122 is formed through the lower end of vertical member 100, and intersects the diametrical threaded bore 112 at right angles thereto. This opening has a counterbore 124 on the inner face thereof.

Figure 5:
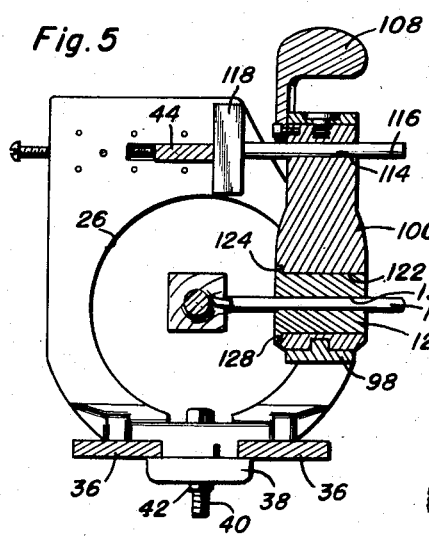
Figure 5 is a vertical sectional view taken substantially along the plane defined by reference line 5—5 of Figure 2 illustrating details of construction thereof.
Figure 7:
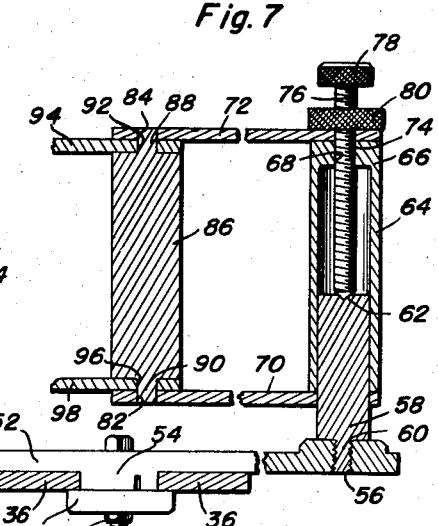
Figure 7 is a vertical sectional view taken substantially along the plane defined by reference line 7—7 of Figure 2 illustrating details of construction for mounting the tool holding linkage on the transverse plate.
Figure 6:
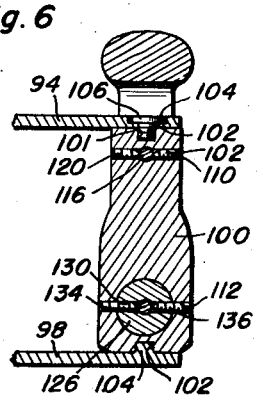
Figure 6 is a vertical sectional view taken substantially along the plane defined by reference line 6—6 of Figure 1 illustrating details of construction of the vertical tool holding member.
Figure 8:
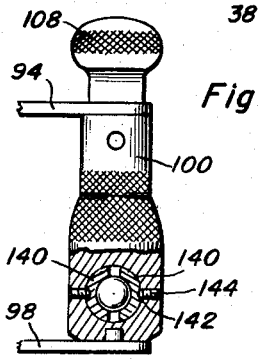
Figure 8 is a view of the vertical tool holding member with parts broken away for clarity, illustrating its adaptation for use in holding a router.

Looking now at Figures 5 and 6 in particular, it may be seen that a circular block 126 is fixed into opening 122, this block having a lip 128 thereon which engages counterbore 124. Because of counterbore 124, the lip 128 fits flush with the outer surface of vertical member 100. Diametrical horizontal threaded bores 130 are formed through block 126, and in alignment with diametrical threaded bore 112. A smooth horizontal bore 132 is formed longitudinally through block 126, and intersects the diametrical threaded bores 130. Into this bore 132 is passed a chisel 134, which may be locked in place by means of setscrews 136 which are threaded through bores 112 and 130, and serve to hold the chisel 134 firmly in place.

However, if it is desired to use a routing tool 138 instead, the block 126 may be removed, and split rings 140 inserted therein. The split rings have depressions 142 formed therein, so that setscrews 144 may hold these split rings 140 firmly against router 138 and hold the same securely in place.

In use, the tool would be initially set up as illustrated in Figure 1, wherein as the work begins to turn the follower 116 may be moved along the outer surface of template 44, so that chisel 134 will engage the turning work 150. However, if it is desired, a sample 50 may be used in place of template 44, and a router 138 may be used instead of chisel 134. In this case, it would not be absolutely necessary for the work to be turned, since the router will be given the same movements as the contour of the article to be produced 50. In this case, the router 138 would form all the contours, and depressions which are to be formed in the finished article. It is to be here noted that flatwork may also be worked upon by the electric router so that this invention is adapted for a great variety of uses.

It may now be seen that I have herein shown and described the new and improved type of duplicator router turning tool which may be quickly and easily used, even by those unskilled in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lathe attachment comprising a pair of base members, means on said base members for securing the latter in longitudinal adjusted positions upon the ways of a lathe, an upstanding wall on each of said base members, a large opening in each of said walls, said openings being aligned with each other and positioned to receive therethrough a work piece secured between the centers of the lathe, means on said walls for securing a template therebetween a spaced distance from the line of centers, a tool holding member, means on said tool holding member for holding a tool and a follower in fixed relation relative to each other, linkage means pivotally mounting said tool holding member to said lathe for movement along and towards and away from the line of centers selectively in a plurality of planes which are parallel to each other with said follower positioned to engage the templet and guide the tool along a work piece positioned between the centers of the lathe.

2. The combination of claim 1 wherein said securing means includes means for securing said template in adjusted positions in a plane parallel to the line of centers.

3. The combination of claim 1 wherein said walls include means for attaching a sample piece of work therebetween.

4. The combination of claim 1 wherein said mounting means includes means for adjustably raising and lowering said tool and said follower.

5. The combination of claim 1 wherein said mounting means includes a plate having means thereon for securing the plate in longitudinal adjusted positions upon the ways of a lathe intermediate said walls, an upstanding stud secured to said plate, a downwardly opening cylinder rotatably disposed about the upper portion of said stud, first laterally extending top and bottom links having an end of each secured to the top and bottom of said cylinder respectively, a handle rotatably journaled between the free ends of said first links, second laterally extending top and bottom links having an end of each secured to the top and bottom of said handle, the free ends of said links secured to said tool holding member.

References Cited in the file of this patent

UNITED STATES PATENTS

| | | |
|---|---|---|
| 186,701 | Arbey | Jan. 30, 1877 |
| 2,769,466 | Brauneis | Nov. 6, 1956 |